United States Patent
Fujino et al.

(10) Patent No.: US 9,372,431 B2
(45) Date of Patent: Jun. 21, 2016

(54) SCANNING OPTICAL APPARATUS, IMAGE FORMING APPARATUS AND METHOD FOR MANUFACTURING A SCANNING LENS

(71) Applicant: BROTHER KOGYO KABUSHIKI KAISHA, Nagoya-shi, Aichi-ken (JP)

(72) Inventors: Hitoshi Fujino, Tajimi (JP); Yoshifumi Nakamura, Ama (JP); Hiroyuki Ominato, Nagoya (JP); Hidetaka Hoshino, Aichi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/632,127

(22) Filed: Feb. 26, 2015

(65) Prior Publication Data
US 2015/0248076 A1 Sep. 3, 2015

(30) Foreign Application Priority Data
Feb. 28, 2014 (JP) .................................. 2014-037744

(51) Int. Cl.
*G03G 15/043* (2006.01)
*G02B 26/12* (2006.01)

(52) U.S. Cl.
CPC ............ *G03G 15/043* (2013.01); *G02B 26/125* (2013.01)

(58) Field of Classification Search
CPC .......... B41J 2/385; G02B 26/08; G02B 26/10
USPC ................. 347/230, 231, 241, 243, 244, 256, 347/258–261
See application file for complete search history.

(56) References Cited

U.S. PATENT DOCUMENTS

| | | | |
|---|---|---|---|
| 5,025,268 A * | 6/1991 | Arimoto et al. | 347/259 |
| 5,818,505 A | 10/1998 | Kato | |
| 6,476,846 B1 | 11/2002 | Kashima et al. | |
| 2007/0119935 A1 | 5/2007 | Shimomura | |
| 2011/0216152 A1 * | 9/2011 | Kato | 347/259 |
| 2012/0002261 A1 * | 1/2012 | Yukawa et al. | 359/204.2 |
| 2015/0226958 A1 * | 8/2015 | Hayakawa | G02B 26/12 359/200.1 |

FOREIGN PATENT DOCUMENTS

| | | |
|---|---|---|
| JP | H08-297256 A | 11/1996 |
| JP | H11-237569 A | 8/1999 |
| JP | 2001-154127 A | 6/2001 |
| JP | 2003-302593 A | 10/2003 |
| JP | 2007-155838 A | 6/2007 |
| JP | 2008-310347 A | 12/2008 |

\* cited by examiner

*Primary Examiner* — Sarah Al Hashimi
(74) *Attorney, Agent, or Firm* — Merchant & Gould P.C.

(57) ABSTRACT

In a scanning optical apparatus including a light source, a light deflector having a reflecting surface, and a single scanning lens, a light flux deflected in a main scanning direction is focused on an image surface. The reflecting and image surfaces are conjugate to each other with respect to a sub scanning direction, Bmax×Bmin>0, and Dmax×Dmin<0 where Bmax and Bmin are a maximum value and a minimum value, respectively, of paraxial focal points, Dmax and Dmin are a maximum value and a minimum value, respectively, of midpoints of focal depth in the sub scanning plane, the values being determined with reference to the image surface, wherein the value of the image surface is 0 and the values on a farther-from-the-scanning-lens side behind the image surface have positive values.

20 Claims, 15 Drawing Sheets

| | | Illustrative Example | Pre-correction Comparative Example | Post-correction Comparative Example |
|---|---|---|---|---|
| Positions of midpoints of focal depth in sub scanning direction | Dmax | 0.26 | 1.73 | 1.10 |
| | Dmin | -0.18 | -0.25 | -0.91 |
| | Dmax×Dmin | -0.05 | -0.44 | -1.00 |
| | \|(Dmax+Dmin)/2\| | 0.04 | 0.74 | 0.10 |
| Paraxial focal points in sub scanning directions | Bmax | -0.33 | 0.96 | 0.22 |
| | Bmin | -0.92 | -0.94 | -1.55 |
| | Bmax×Bmin | 0.31 | -0.91 | -0.34 |
| | \|(Bmax+Bmin)/2\| | 0.63 | 0.01 | 0.67 |
| f-number | Fmax | 68.56 | 70.51 | 70.18 |
| | Fmin | 67.12 | 67.19 | 66.83 |
| | Fave | 67.85 | 68.43 | 68.03 |
| | (Fmax-Fmin)/Fave | 0.021 | 0.048 | 0.049 |
| Conditions | Bmax×Bmin>0 AND Dmax×Dmin<0 | OK | NG | NG |
| | \|(Bmax+Bmin)/2\| > \|(Dmax+Dmin)/2\| | OK | NG | OK |
| | Bmax<0 AND Bmin<0 | OK | NG | NG |
| | Dmin>Bmax | OK | NG | NG |
| | \|Dmax\|<1[mm] AND \|Dmin\|<1[mm] | OK | NG | NG |
| | (Fmax-Fmin)/Fave<0.05 | OK | OK | OK |

FIG.6

PARAMETERS FOR ILLUSTRATIVE EXAMPLE

| | | |
|---|---|---|
| WAVELENGTH | $\lambda$ [nm] | 788 |
| REFRACTIVE INDEX OF SCANNING LENS | n | 1.503 |
| ANGLE OF INCIDENCE ON POLYGON MIRROR | $\alpha$ [deg] | 90 |
| DISTANCE FROM POLYGON MIRROR TO SCANNING LENS | e [mm] | 33.9 |
| THICKNESS AT CENTER OF SCANNING LENS | d [mm] | 13.5 |
| DISTANCE FROM SCANNING LENS TO IMAGE SURFACE | fb [mm] | 96.7 |
| f-THETA COEFFICIENT | k [mm] | 126 |
| MAXIMUM SCAN RANGE | [mm] | ±105 |
| MAXIMUM SCAN ANGLE OF POLYGON MIRROR | $\theta$ eos [deg] | 50.0 |
| DISTANCE FROM POLYGON MIRROR TO NATURAL CONVERGENT POINT | fc [mm] | 247.9 |

| CONSTANTS OF LENS | | |
|---|---|---|
| | FIRST SURFACE (INCIDENT SIDE) | SECOND SURFACE (EXIT SIDE) |
| Cy | 1.47E-02 | 6.41E-03 |
| cc | -1.70E+01 | -1.01E+02 |
| A4 | -1.79E-06 | -2.60E-06 |
| A6 | 1.08E-09 | 8.93E-10 |
| A8 | -1.22E-13 | -2.89E-13 |
| A10 | 1.43E-17 | 7.63E-17 |
| A12 | -1.11E-21 | -9.01E-21 |
| Cx | -8.09E-02 | -1.06E-01 |
| B2 | 1.87E-03 | 5.97E-04 |
| B4 | -2.55E-06 | -7.57E-07 |
| B6 | 2.36E-09 | 5.07E-10 |
| B8 | -1.33E-12 | -2.22E-13 |
| B10 | 3.92E-16 | 5.49E-17 |
| B12 | -4.64E-20 | -5.73E-21 |
| LENS SURFACE SHIFT AMOUNT D1 [mm] | -0.303 | |
| LENS SURFACE TILT AMOUNT $\beta$1 [deg] | -0.206 | |
| LENS SURFACE SHIFT AMOUNT D2 [mm] | | 0.041 |
| LENS SURFACE TILT AMOUNT $\beta$2 [deg] | | -0.261 |

FIG.11

PARAMETERS FOR PRE-CORRECTION COMPARATIVE EXAMPLE

| WAVELENGTH | λ [nm] | 788 |
|---|---|---|
| REFRACTIVE INDEX OF SCANNING LENS | n | 1.503 |
| ANGLE OF INCIDENCE ON POLYGON MIRROR | α [deg] | 90 |
| DISTANCE FROM POLYGON MIRROR TO SCANNING LENS | e [mm] | 32.7 |
| THICKNESS AT CENTER OF SCANNING LENS | d [mm] | 13.5 |
| DISTANCE FROM SCANNING LENS TO IMAGE SURFACE | fb [mm] | 98.0 |
| f-THETA COEFFICIENT | k [mm] | 126 |
| MAXIMUM SCAN RANGE | [mm] | ±105 |
| MAXIMUM SCAN ANGLE OF POLYGON MIRROR | θeos [deg] | 50.0 |
| DISTANCE FROM POLYGON MIRROR TO NATURAL CONVERGENT POINT | fc [mm] | 256.6 |
| CONSTANTS OF LENS | | |
| | FIRST SURFACE (INCIDENT SIDE) | SECOND SURFACE (EXIT SIDE) |
| Cy | 1.49E-02 | 6.26E-03 |
| cc | -1.68E+01 | -1.03E+02 |
| A4 | -2.05E-06 | -2.92E-06 |
| A6 | 1.36E-09 | 1.15E-09 |
| A8 | -5.37E-13 | -3.28E-13 |
| A10 | 1.18E-16 | 5.18E-17 |
| A12 | -1.09E-20 | -2.94E-21 |
| Cx | -7.99E-02 | -1.06E-01 |
| B2 | 1.30E-03 | 4.99E-04 |
| B4 | 3.84E-06 | 8.40E-08 |
| B6 | -6.37E-09 | -5.02E-10 |
| B8 | 3.98E-12 | 3.56E-13 |
| B10 | -1.19E-15 | -1.16E-16 |
| B12 | 1.42E-19 | 1.52E-20 |
| LENS SURFACE SHIFT AMOUNT D1 [mm] | -0.265 | |
| LENS SURFACE TILT AMOUNT β1 [deg] | -0.185 | |
| LENS SURFACE SHIFT AMOUNT D2 [mm] | | 0.042 |
| LENS SURFACE TILT AMOUNT β2 [deg] | | -0.245 |

FIG.15

PARAMETERS FOR POST-CORRECTION COMPARATIVE EXAMPLE

| | | |
|---|---|---|
| WAVELENGTH | λ [nm] | 788 |
| REFRACTIVE INDEX OF SCANNING LENS | n | 1.503 |
| ANGLE OF INCIDENCE ON POLYGON MIRROR | α [deg] | 90 |
| DISTANCE FROM POLYGON MIRROR TO SCANNING LENS | e [mm] | 32.7 |
| THICKNESS AT CENTER OF SCANNING LENS | d [mm] | 13.5 |
| DISTANCE FROM SCANNING LENS TO IMAGE SURFACE | fb [mm] | 98.0 |
| f-THETA COEFFICIENT | k [mm] | 126 |
| MAXIMUM SCAN RANGE | [mm] | ±105 |
| MAXIMUM SCAN ANGLE OF POLYGON MIRROR | θ eos [deg] | 50.0 |
| DISTANCE FROM POLYGON MIRROR TO NATURAL CONVERGENT POINT | fc [mm] | 256.6 |
| CONSTANTS OF LENS | | |
| | FIRST SURFACE (INCIDENT SIDE) | SECOND SURFACE (EXIT SIDE) |
| Cy | 1.49E-02 | 6.26E-03 |
| cc | -1.68E+01 | -1.03E+02 |
| A4 | -2.05E-06 | -2.92E-06 |
| A6 | 1.36E-09 | 1.15E-09 |
| A8 | -5.37E-13 | -3.28E-13 |
| A10 | 1.18E-16 | 5.18E-17 |
| A12 | -1.09E-20 | -2.94E-21 |
| Cx | -7.95E-02 | -1.06E-01 |
| B2 | 1.32E-03 | 4.99E-04 |
| B4 | 3.75E-06 | 8.40E-08 |
| B6 | -6.21E-09 | -5.02E-10 |
| B8 | 3.88E-12 | 3.56E-13 |
| B10 | -1.17E-15 | -1.16E-16 |
| B12 | 1.42E-19 | 1.52E-20 |
| LENS SURFACE SHIFT AMOUNT D1 [mm] | -0.265 | |
| LENS SURFACE TILT AMOUNT β1 [deg] | -0.185 | |
| LENS SURFACE SHIFT AMOUNT D2 [mm] | | 0.042 |
| LENS SURFACE TILT AMOUNT β2 [deg] | | -0.245 |

FIG.19

|  |  | Illustrative Example | Pre-correction Comparative Example | Post-correction Comparative Example |
|---|---|---|---|---|
| Positions of midpoints of focal depth in sub scanning direction | Dmax | 0.26 | 1.73 | 1.10 |
| | Dmin | -0.18 | -0.25 | -0.91 |
| | Dmax×Dmin | -0.05 | -0.44 | -1.00 |
| | \|(Dmax+Dmin)/2\| | 0.04 | 0.74 | 0.10 |
| Paraxial focal points in sub scanning directions | Bmax | -0.33 | 0.96 | 0.22 |
| | Bmin | -0.92 | -0.94 | -1.55 |
| | Bmax×Bmin | 0.31 | -0.91 | -0.34 |
| | \|(Bmax+Bmin)/2\| | 0.63 | 0.01 | 0.67 |
| f-number | Fmax | 68.56 | 70.51 | 70.18 |
| | Fmin | 67.12 | 67.19 | 66.83 |
| | Fave | 67.85 | 68.43 | 68.03 |
| | (Fmax-Fmin)/Fave | 0.021 | 0.048 | 0.049 |
| Conditions | Bmax×Bmin>0 AND Dmax×Dmin<0 | OK | NG | NG |
| | \|(Bmax+Bmin)/2\| > \|(Dmax+Dmin)/2\| | OK | NG | OK |
| | Bmax<0 AND Bmin<0 | OK | NG | NG |
| | Dmin>Bmax | OK | NG | NG |
| | \|Dmax\|<1[mm] AND \|Dmin\|<1[mm] | OK | NG | NG |
| | (Fmax-Fmin)/Fave<0.05 | OK | OK | OK |

SCANNING OPTICAL APPARATUS, IMAGE FORMING APPARATUS AND METHOD FOR MANUFACTURING A SCANNING LENS

CROSS-REFERENCE TO RELATED APPLICATION(S)

This application claims priority from Japanese Patent Application No. 2014-037744 filed on Feb. 28, 2014, the disclosure of which is incorporated herein by reference in its entirety.

TECHNICAL FIELD

Apparatuses and methods disclosed herein relate to a scanning optical apparatus, a method for manufacturing a scanning lens for use in a scanning optical apparatus, and an image forming apparatus including a scanning optical apparatus.

BACKGROUND ART

In a scanning optical apparatus wherein a light flux emitted from a light source is deflected by a polygon mirror and focused by a single scanning lens on an image surface to be scanned to form an image thereon, a change in F-number varying according to an image height (i.e., a position in a main scanning direction) may preferably be suppressed by any means.

SUMMARY

No prior art in the realm of the scanning optical apparatus has ever proposed to address the problem of deviation of a focal point in a sub scanning direction. This would disadvantageously result in an undesirable variation in imaging properties of a light flux according to the image height.

It would be desirable to provide a scanning optical apparatus, a method for manufacturing a scanning lens for use in a scanning optical apparatus, or an image forming apparatus including a scanning optical apparatus in which a variation in a midpoint of focal depth in a sub scanning direction can be suppressed.

In one aspect, a scanning optical apparatus is provided which comprises a light source configured to emit a light flux, a light deflector having a reflecting surface and configured to deflect the light flux emitted from the light source in a main scanning direction; and a single scanning lens configured to focus the light flux deflected by the light deflector on an image surface to be scanned. The scanning lens is configured such that the reflecting surface and the image surface are conjugate to each other with respect to a sub scanning direction orthogonal to the main scanning direction. In addition, the following condition is satisfied:

$B\mathrm{max} \times B\mathrm{min} > 0$, and $D\mathrm{max} \times D\mathrm{min} < 0$ where Bmax is a maximum value of paraxial focal points in the sub scanning plane, Bmin is a minimum value of the paraxial focal points in the sub scanning plane, Dmax is a maximum value of midpoints of focal depth in the sub scanning plane, and Dmin is a minimum value of the midpoints of focal depth in the sub scanning plane, the values being determined with reference to the image surface, wherein the value of the image surface is 0 and the values of points on a farther-from-the-scanning-lens side behind the image surface have positive values.

In another aspect, an image forming apparatus comprising a photoconductor, a light source, a light deflector, a single scanning lens, and a development unit is provided. The photoconductor has an image surface to be exposed to light. The light source is configured to emit a light flux. The light deflector has a reflecting surface and is configured to deflect the light flux emitted from the light source in a main scanning direction. The scanning lens is configured to focus the light flux deflected by the light deflector on the image surface. The development unit is configured to supply developer onto the image surface of the photoconductor. The scanning lens is configured such that:

the reflecting surface and the image surface are conjugate to each other with respect to a sub scanning direction orthogonal to the main scanning direction, $B\mathrm{max} \times B\mathrm{min} > 0$, and $D\mathrm{max} \times D\mathrm{min} < 0$ where Bmax is a maximum value of paraxial focal points in the sub scanning plane, Bmin is a minimum value of the paraxial focal points in the sub scanning plane, Dmax is a maximum value of midpoints of focal depth in the sub scanning plane, and Dmin is a minimum value of the midpoints of focal depth in the sub scanning plane, the values being determined with reference to the image surface, wherein the value of the image surface is 0 and the values of points on a farther-from-the-scanning-lens side behind the image surface have positive values.

In yet another aspect, a method for method for manufacturing a scanning lens for use in a scanning optical apparatus which includes a light source configured to emit a light flux, a light deflector having a reflecting surface and configured to deflect the light flux emitted from the light source in a main scanning direction and a single scanning lens configured to focus the light flux deflected by the light deflector on an image surface to be scanned, the scanning lens being configured such that the reflecting surface and the image surface are conjugate to each other with respect to a sub scanning direction orthogonal to the main scanning direction is provided. The method comprises: providing a first mold having an incident surface forming surface corresponding to an incident surface at which the light flux enters the scanning lens and a second mold having an exit surface forming surface corresponding to an exit surface at which the light flux exits the scanning lens; and forming a scanning lens using the first mold and the second mold, wherein the providing the first mold and the second mold comprises forming the incident surface forming surface of the first mold and the exit surface forming surface of the second mold in such a manner that:

$B\mathrm{max} \times B\mathrm{min} > 0$, and $D\mathrm{max} \times D\mathrm{min} < 0$ where Bmax is a maximum value of paraxial focal points in the sub scanning plane, Bmin is a minimum value of the paraxial focal points in the sub scanning plane, Dmax is a maximum value of midpoints of focal depth in the sub scanning plane, and Dmin is a minimum value of the midpoints of focal depth in the sub scanning plane, the values being determined with reference to the image surface, wherein the value of the image surface is 0 and the values of points on a farther-from-the-scanning-lens side behind the image surface have positive values.

BRIEF DESCRIPTION OF THE DRAWINGS

The above and other aspects, their advantages and further features will become more apparent by describing in detail illustrative, non-limiting embodiments thereof with reference to the accompanying drawings, in which:

FIG. 6 is a table showing parameters of an optical system embodied in accordance with one illustrative Example;

FIG. 11 is a table showing parameters of an optical system provided as a pre-correction Comparative Example;

FIG. 15 is a table showing parameters of an optical system provided as a post-correction Comparative Example;

FIG. 19 is a table showing values of the illustrative Example, pre-correction Comparative Example and post-correction Comparative Example for contrastive purposes.

DESCRIPTION OF EMBODIMENTS

A detailed description will be given of an illustrative, non-limiting embodiment with reference made to the drawings where appropriate. In the following description, a general setup of a laser printer 100 as an example of an image forming apparatus will be described briefly with reference to FIG. 1 at the outset, and then a specific configuration of a scanning optical apparatus 10 will be described in detail.

Figure 1:
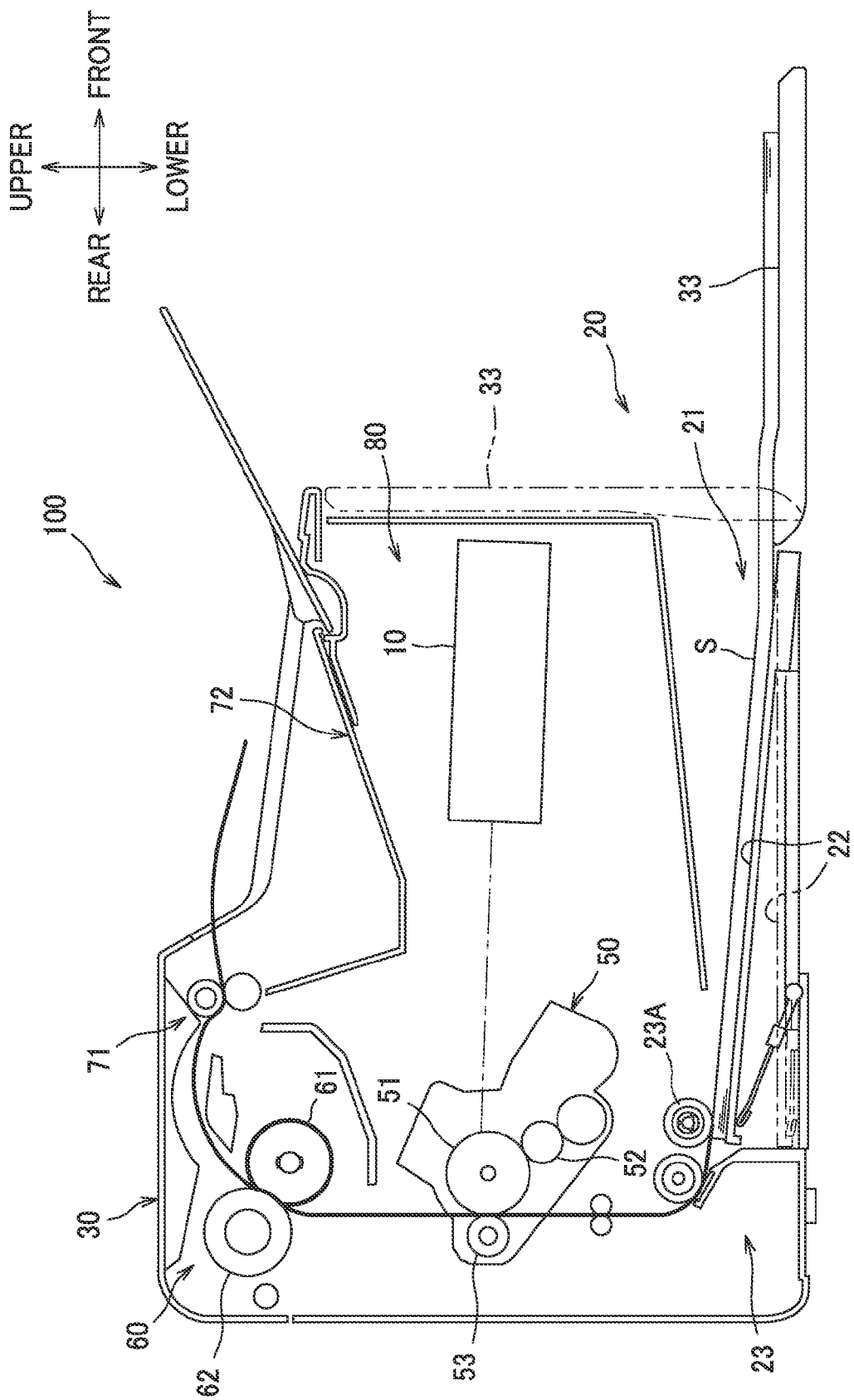
FIG. 1 is a sectional view of an image forming apparatus according to one exemplary embodiment.

As shown in FIG. 1, the laser printer 100 comprises a body casing 30, and several components housed within the body casing 30, which principally includes a feeder unit 20 for feeding a sheet S (e.g., of paper), and an image forming unit 80 for forming an image on the sheet S fed by the feeder unit 20. The image forming unit 80 includes a scanning optical apparatus 10, a process cartridge 50, a fixing unit 60, and other units. The process cartridge 50 includes a development section and a transfer section. In the following description, the direction is designated such that in FIG. 1, the left-hand side of the drawing sheet corresponds to the "rear" side of the printer, the right-hand side of the drawing sheet corresponds to the "front" side of the printer, the upper/lower (upward/downward or top/bottom) sides of the drawing sheet corresponds to the "upper/under or top/bottom" sides of the printer, the front side of the drawing sheet corresponds to the "left" side of the printer, and the back side of the drawing sheet corresponds to the "right" side of the printer.

The feeder unit 20 includes a sheet feed tray 21 which is made available by opening a front cover 33 of the body casing 30, a sheet pressure plate 22 provided on the sheet feed tray 21, and a sheet feed mechanism 23 which includes a sheet feed roller 23A provided at the rear side of the sheet feed tray 21. In the feeder unit 20, sheets S in the sheet feed tray 21 are pressed against the sheet feed roller 23A by the sheet pressure plate 22. Each sheet S is conveyed by rotation of the sheet feed roller 23A upwardly along a conveyor guide (not shown) into the image forming unit 80.

The process cartridge 50 is provided above the sheet feed tray 21 in a rear space within the body casing 30, and configured to be removable from and installable in the body casing 30. The process cartridge 50 includes a photoconductor drum 51 as one example of a photoconductor, a development roller 52 as one example of a development unit, and a transfer roller 53. The photoconductor drum 51 has a peripheral surface which is positively charged by a charger (not shown) and then exposed to light by the scanning optical apparatus 10, so that an electrostatic latent image is formed on the peripheral surface of the photoconductor drum 51. The development roller 52 is a member that is configured to carry toner (developer) stored in the process cartridge 50 and to supply toner to the electrostatic latent image on the peripheral surface of the photoconductor drum 51, thereby forming a toner image thereon. The transfer roller 53 is a member that is configured to transfer the toner image from the photoconductor drum 51 onto a sheet S conveyed through between the photoconductor drum 51 and the transfer roller 53, by a transfer bias applied between the photoconductor drum 51 and the transfer roller 53.

The scanning optical apparatus 10 is disposed at the front side of the process cartridge 50, and configured to emit a laser beam onto the peripheral surface of the photoconductor drum 51, which laser beam is modulated on and off in accordance with image data. A specific configuration of the scanning optical apparatus 10 will be described later in detail.

The fixing unit 60 includes a heating roller 61 including a heat source, and a pressure roller 62 configured to be pressed against the heating roller 61 with a sheet S pinched between the heating roller 61 and the pressure roller 62. The fixing unit 60 is disposed above the process cartridge 50, and configured to thermally fix a toner image on a sheet S fed from the process cartridge 50. An ejection roller 71 is provided at the front side of the fixing unit 60, and configured to eject a sheet S with a toner image thermally fixed thereon by the fixing unit 60, onto the sheet output tray 72 provided on a front area of an upper side of the body casing 30.

Figure 2:
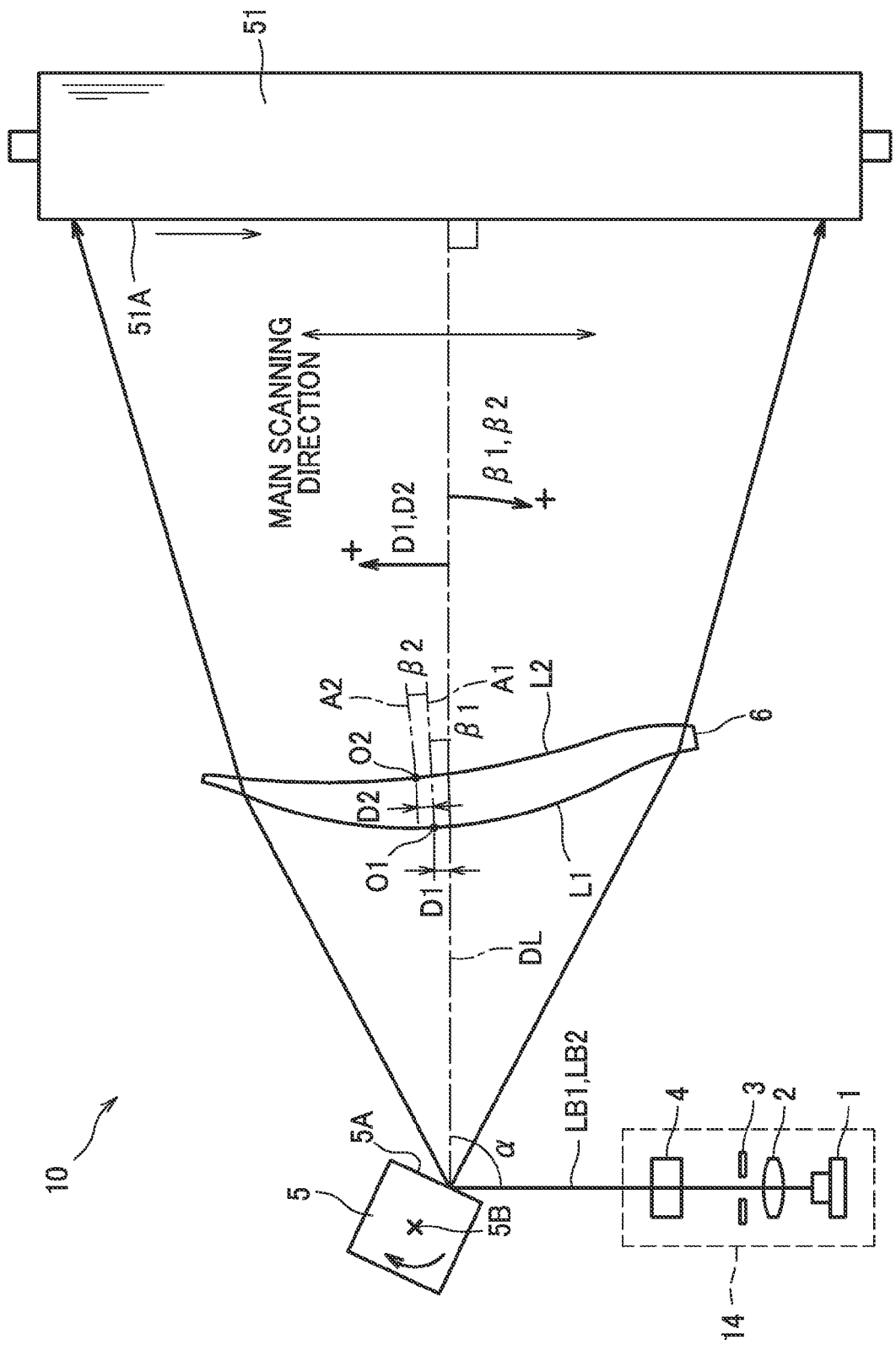
FIG. 2 is a sectional view of a scanning optical apparatus according to one exemplary embodiment, taken along a main scanning plane.

As shown in FIG. 2, the scanning optical apparatus 10 includes a light source device 14 as one example of a light source, a polygon mirror 5 as one example of a light deflector, and a single scanning lens 6. All of these components of the scanning optical apparatus 10 are arranged and configured such that light fluxes LB1, LB2 (laser beams) emitted from the light source device 14 are focused on the peripheral surface (image surface to be scanned) of the photoconductor drum 51 and the image surface is scanned with the laser beams LB1, LB2, so that an electrostatic latent image is formed on the image surface.

The light source device 14 includes a semiconductor laser 1, a coupling lens 2, an aperture stop 3 and a cylindrical lens 4.

Figure 3:
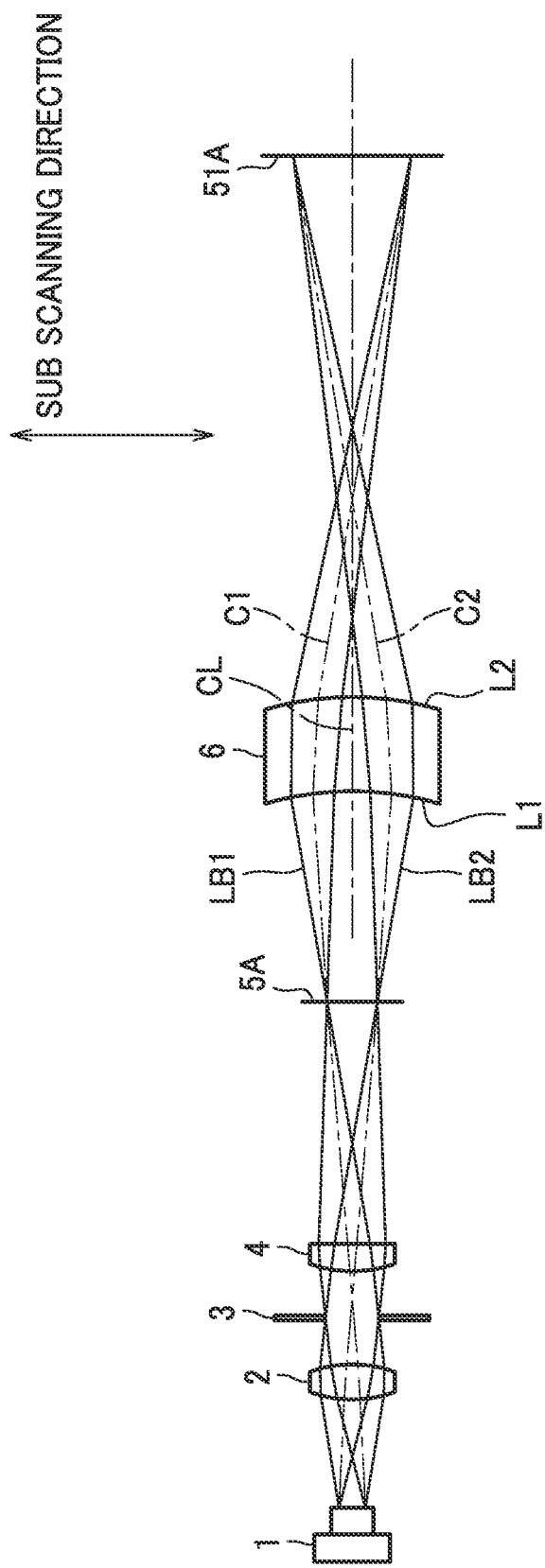
FIG. 3 is a sectional view of an optical system of the scanning optical apparatus, taken along a sub scanning plane.

As show in FIG. 3, the semiconductor laser 1 is a device configured to emit divergent laser beams. In one embodiment, the semiconductor laser 1 includes a plurality of (e.g., two) light-emitting elements arranged in positions shifted from each other in the sub scanning direction, so that two laser beams are directed to propagate along two paths shifted in the sub scanning direction.

The coupling lens 2 is configured to convert the two laser beams emitted from the semiconductor laser 1 into light fluxes LB1, LB2. In the present embodiment, the light fluxes LB1, LB2 coming from the coupling lens 2 are light fluxes that converge intrinsically into predetermined convergent points.

The aperture stop 3 is a member having an opening that determines the diameters of the light fluxes LB1, LB2 coming from the coupling lens 2.

The cylindrical lens 4 is configured to converge the light fluxes LB1, LB2 having passed through the coupling lens 2 and the aperture stop 3 in the sub scanning direction so that the light fluxes LB1, LB2 are focused on or near a reflecting surface 5A of the polygon mirror 5 in the form of linear images elongate in the main scanning direction.

All the components 1, 2, 3, 4, 5 are arranged and configured so that each of centers C1, C2 of the light fluxes LB1, LB2 passing through the scanning lens 6 is located in a position shifted in the sub scanning direction from an optical axis CL of the scanning lens 6. The positions of the plurality of light-emitting elements shifted from each other in the sub scanning direction as described above may also be shifted from each other in the main scanning direction to some extent.

As shown in FIG. 2, the polygon mirror 5 has a plurality of reflecting surfaces 5A disposed equidistantly from an axis 5B of rotation of the polygon mirror 5; the polygon mirror 5 in this embodiment shown in FIG. 2 has four reflecting surfaces 5A by way of example. The polygon mirror 5 spins at a constant rotational speed about the axis of rotation 5B and reflects and deflects the light fluxes LB1, LB2 having passed through the cylindrical lens 4 in the main scanning direction. Herein, an angle formed with a reference line DL by the light fluxes LB1, LB2 having passed through the cylindrical lens 4 is referred to as an angle of incidence and designated by α. The reference line DL is a line which is, as viewed from the sub scanning direction, coincident with a light path of the laser beam incident on the image surface 51A at right angles. The term "main scanning direction" refers to a direction in which the light fluxes LB1, LB2 are deflected by the polygon mirror 5.

The scanning optical apparatus 10 includes only one scanning lens 6. The scanning lens 6 is configure to convert each light flux LB1, LB2 having been reflected and thus deflected by the polygon mirror 5 into a spot-like image to be focused on the image surface 51A to be scanned. The scanning lens 6 is also configured to correct an optical face tangle error of each reflecting surface 5A of the polygon mirror 5. In this way, the scanning optical apparatus 10 is configured such that each reflecting surface 5A and the image surface 51A to be scanned are conjugate to each other with respect to the sub scanning direction (see FIG. 3).

The scanning lens 6 has f-theta characteristics such that the light fluxes LB1, LB2 deflected at a constant angular velocity by the polygon mirror 5 is converted into light fluxes that scan the image surface 51A at a constant linear velocity. The scanning lens 6 has a pair of opposite lens surfaces, namely, an incident (polygon mirror 5 side) surface L1 and an exit (surface 51A side) surface L2. The incident surface L1 has a concave shape recessed toward the image surface 51A in the sub scanning direction, and the exit surface L2 has a convex shape bulging toward the image surface 51A in the sub scanning direction; thus, the scanning lens 6 generally has a meniscal shape in the sub scanning direction such that the incident surface L1 is concaved toward the image surface 51A and the exit surface L2 is convexed toward the image surface 51A.

Each of the incident surface L1 and the exit surface L2 is a toric surface, and a generatrix of the toric surface may be represented, for example, by the formula (1):

$$z = \frac{C_y y^2}{1 + \sqrt{1 - (1+cc)c_y^2 y^2}} + A_4 y^4 + A_6 y^6 + A_8 y^8 + A_{10} y^{10} + A_{12} y^{12} \quad (1)$$

where y is a coordinate of y-axis that is contained in a main scanning plane, z is a coordinate of z-axis parallel to an optical axis, $C_y$ is the reciprocal of the radius of curvature in the main scanning direction on the optical axis (the first optical axis A1 of the incident surface L1, the second optical axis A2 of the exit surface L2), and cc, $A_4$, . . . , $A_{12}$ are constants.

A radius r'(y) of curvature in the sub scanning direction on a coordinate y satisfies the formula (2):

$$r'(y) = 1/C_x(1 + B_2 y^2 + B_4 y^4 + B_6 y^6 + B_8 y^8 + B_{10} y^{10} + B_{12} y^{12}) \quad (2)$$

where $C_x$ is the reciprocal of the radius of curvature in the sub scanning direction on the optical axis (the first optical axis A1 of the incident surface L1, the second optical axis A2 of the exit surface L2), and $B_2$, . . . , $B_{12}$ are constants.

Figure 4:
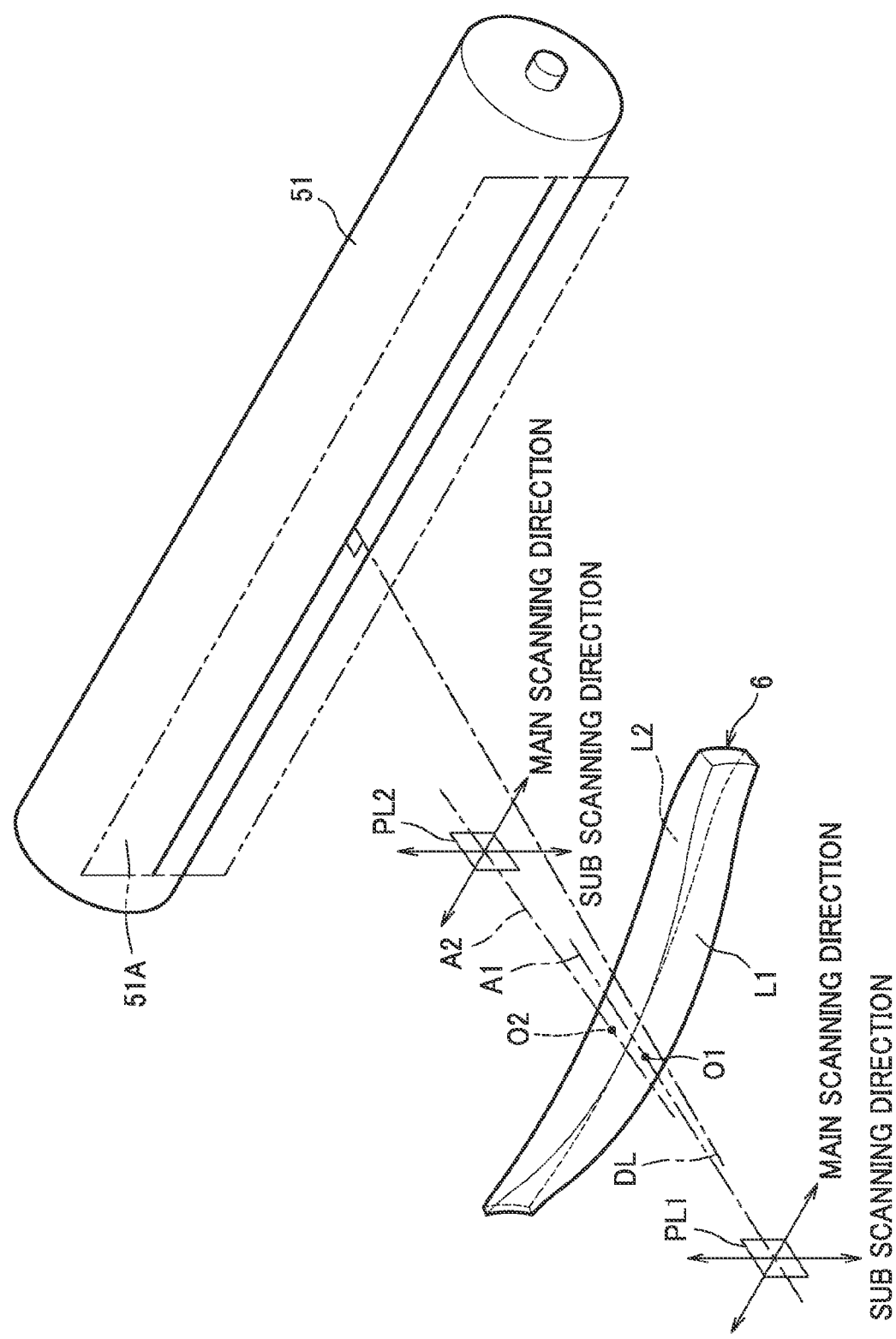
FIG. 4 is a perspective view for explaining a main scanning direction and a sub scanning direction for each of lens surfaces of a lens.

The radius r'(y) of curvature of the incident surface L1 and the exit surface L2 in a sub scanning plane (cross section perpendicular to the main scanning direction) varies continuously and symmetrically from a position corresponding to the first optical axis A1 of the lens surface L1 or the second optical axis A2 of the lens surface L2 outward in the main scanning direction within an effective range (within the region to be used for image formation). The generatrix of the toric surface of the scanning lens 6 is symmetric in the main scanning direction. Therefore, the incident surface L1 has a shape symmetric with respect to a sub scanning plane PL1 in which the first optical axis A1 is contained (see FIG. 4), and the exit surface L2 has a shape symmetric with respect to a sub scanning plane PL2 in which the second optical axis A2 is contained (see FIG. 4). With this configuration, the incident surface L1 and the exit surface L2 can be fabricated easily. The incident surface L1 and the exit surface L2 may be formed for example by plastic injection molding or glass molding, using molds having cavity surfaces of shapes reversely contoured to fit the shapes of these surfaces L1, L2. Since each of the incident surface L1 and the exit surface L2 has a shape symmetric with respect to the sub-scanning plane PL1, PL2 containing the optical axis A1, A2, a correction made in making the mold and an inspection made to the shape of the mold and the castings (molded products) can be carried out easily.

A sign of the curvature in the sub scanning direction (the reciprocal of the radius r'(y) of curvature) which, assumedly, is positive when the incident or exit surface L1, L2 of the scanning lens 6 is convexed, and is negative when the surface L1, L2 of the scanning lens 6 is concaved, is retained unchanged throughout an effective range of the scanning lens in the main scanning direction. An absolute value of the curvature decreases from the optical axis toward outside away from the optical axis (the first optical axis A1, the second optical axis A2), throughout the effective range of the scanning lens 6 in the main scanning direction. In other words, the absolute value of the radius of curvature along the coordinate y in the main scanning direction ($|r'(y)|$) satisfies the following condition: if $|y1|<|y2|$, then $|r'(y1)|<|r'(y2)|$.

Given an x-axis that is orthogonal to the optical axis in each sub scanning plane PL1, PL2, the shape of the scanning lens 6 in the sub scanning direction may be represented with sagittae in the sub scanning direction, by the following formula:

$$s = \frac{x^2/r'}{1+\sqrt{1-(x/r')^2}} \quad (3)$$

The scanning optical apparatus 10 is configured such that:

$B\max \times B\min > 0$, and $D\max \times D\min < 0$ where Bmax is a maximum value of paraxial focal points in the sub scanning plane, Bmin is a minimum value of the paraxial focal points in the sub scanning plane, Dmax is a maximum value of midpoints of focal depth in the sub scanning plane, and Dmin is a minimum value of the midpoints of focal depth in the sub scanning plane, the values being determined with reference to the image surface, wherein the value of the image surface 51A is 0 and the values of points on a farther-from-the-scanning-lens side behind the image surface have positive values. In other words, the paraxial focal points are entirely shifted to either of the front side (the scanning lens 6 side) or the back side (the side away from the scanning lens 6) of the image surface 51A, and the midpoints of focal depth in the sub scanning plane are distributed such that the maximum value Dmax is on one of the front and back sides of the image surface 51A and the minimum value Dmin is on the other of the front and back sides of the image surface 51A. It is to be understood that the maximum and minimum values used herein refer to the maximum and minimum values determined among the values distributed in the effective range in the main scanning direction.

In this scanning optical apparatus 10 in this embodiment, the following condition is satisfied:

$|(B\max+B\min)/2|>|(D\max+D\min)/2|$.

As represented in this inequality, the absolute value of an average of the maximum value Bmax and the minimum value Bmin of paraxial focal points in the sub scanning plane is greater than the absolute value of an average of the maximum value Dmax and the minimum value Dmin of midpoints of focal depth in the sub scanning plane.

Further, in the scanning optical apparatus 10 in this embodiment, the following conditions may be satisfied:

$B\max<0$, and $B\min<0$.

As represented in this inequality, the paraxial focal points may be located on the front side of the image surface 51A throughout the effective range.

Further, in this configuration where the paraxial focal points are located on the front side of the image surface 51A throughout the effective range, additionally, the following condition may be satisfied:

$D\min>B\max$.

As represented in this inequality, the paraxial focal point nearest to the image surface 51A in the sub scanning plane may be located frontwardly of the frontmost of the midpoints of focal depth in the sub scanning plane.

Further, in the scanning optical apparatus 10, the following conditions may preferably be satisfied:

$|D\max|<1$ [mm], and $|D\min|<1$ [mm].

If the focal depths in the sub scanning plane are distributed so close to the image surface 51A as represented in this inequalities, a high-quality image can be formed.

Further, in the scanning optical apparatus 10, the following condition may preferably be satisfied:

$(F\max-F\min)/F\text{ave}<0.05$ where Fmax is a maximum F-number in the sub scanning direction, Fmin is a minimum F-number in the sub scanning direction, and Fave is an average F-number in the sub scanning direction. As represented in this inequality, it is preferable that the range of variations in the average F-number is less than 5%.

As shown in FIG. 2, a distance from the point of reflection at the reflecting surface 5A to the incident surface L1, and a distance from the exit surface L2 to the image surface 51A vary with an image height y on the image surface 51A. The positions at which light fluxes LB1, LB2 from the light source device 14 strike the reflecting surface 5A of the polygon mirror 5 vary with a direction of deflection. Therefore, a curvature of field (i.e., variations in defocusing with the positions along the main scanning direction) occurs on the image surface 51A.

In order to properly correct the variations in defocusing with the positions along the main scanning direction, the scanning optical apparatus 10 in the present embodiment is configured to have optimized parameters, whose set values are not equal to zero, of β1 indicating an angle [deg] formed in the main scanning plane between the first optical axis A1 of the incident surface L1 of the scanning lens 6 and the reference line DL, β2 indicating an angle [deg] formed in the main scanning plane between the first optical axis A1 and the second optical axis A2 of the exit surface L2 of the scanning lens 6, D1 indicating an amount of shift [mm] in the main scanning plane, of a point O1 of intersection between the first optical axis A1 and the incident surface L1 from the reference line DL, and D2 indicates an amount of shift [mm] in the main scanning plane, of a point O2 of intersection between the second optical axis A2 and the exit surface L2, from the first optical axis A1.

Herein, the angles β1 and β2 have signs indicating their directions such that the clockwise direction in FIG. 2 is assumed to be positive, and the amounts D1 and D2 of shift have signs indicating their directions such that the upward direction in FIG. 2 (the direction perpendicular to the reference line DL and opposite to the direction toward the semiconductor laser 1) is assumed to be positive.

With the scanning optical apparatus 10 configured as described above, in which the paraxial focal points are shifted to the front side (upstream side in the direction of travel of the laser beam) of the image surface 51A, the midpoints of focal depth of the laser beam can be distributed closer to the image surface 51A than the paraxial focal points in the sub scanning plane, so that undesirable variations in the position of the midpoints of focal depth in the sub scanning plane can be suppressed. Accordingly, the laser printer 100 comprising this scanning optical apparatus 10 can obtain a high-quality image formed by reducing variations in the beam diameter on the image surface 51A.

Since the scanning lens 6 is configured such that the second optical axis A2 of the exit surface L2 inclines with respect to the first optical axis A1 of the incident surface L1 at the angle β2 and shifted in the main scanning direction by the amount D2, an undesirable shift of the midpoints of focal depth with the image height on the image surface 51A can be suppressed even in the laser printer 100 comprising a single scanning lens 6 and a polygon mirror 5 having reflecting surfaces 5A located apart from the axis 5B of rotation and configured to reflect a laser beam.

Next, a method for manufacturing a scanning lens 6 for use in a scanning optical apparatus 10 will be described hereafter.

Figure 5A:
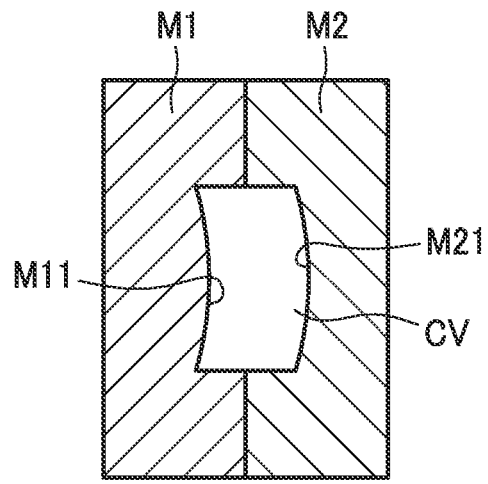
FIGS. 5A and 5B are schematic diagrams showing a preparation step and a forming step, respectively, in a method for manufacturing a scanning lens according to one exemplary embodiment.

In a preparation step, as shown in FIG. 5A, a first mold M1 having an incident surface forming surface M11 corresponding to the incident surface L1 of the scanning lens 6 and a second mold M2 having an exit surface forming surface M21 corresponding to the exit surface L2 of the scanning lens 6 are provided. In this preparation step, the incident surface forming surface M11 and the exit surface forming surface M21 are formed to satisfy the following conditions:

$$B\max \times B\min > 0, \text{ and}$$

$$D\max \times D\min < 0.$$

Also, the following condition is satisfied:

$$|(B\max + B\min)/2| > |(D\max + D\min)/2|.$$

Figure 5B:
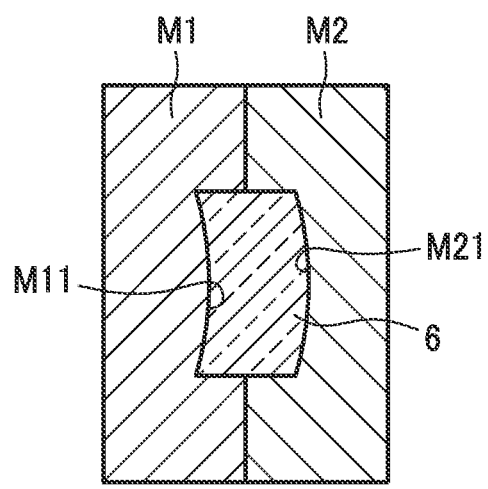

In a molding step, as shown in FIG. 5B, a plastic resin or glass material for the scanning lens 6 is injected in a cavity CV defined between the first mold M1 and the second mold M2 (hereinafter referred to simply as "mold") to form the scanning lens 6.

In a correction step, the molded scanning lens 6 is tested to verify that desired performances are achieved, and correction is made by modifying the incident surface forming surface M11 and the exit surface forming surface M2 of the mold if necessary. Verification of the scanning lens 6 is carried out by measuring beam diameters varying with defocusing in a specific optical system, and the incident surface forming surface M11 and the exit surface forming surface M21 are modified in such a manner that the measured beam diameters fall within a predetermined range of values, i.e., the midpoints of focal depth in the sub scanning plane are made closer to zero (to the image surface 51A).

In contrast to this method for manufacturing a scanning lens, if the scanning lens would be manufactured using a mold having an incident surface forming surface M1 and an exit surface forming surface M21 designed to form a lens with the paraxial focal points closer to the image surface 51A than the midpoints of focal depth in the sub scanning plane, the subsequent correction step of modifying the incident surface forming surface M11 and the exit surface forming surface M21 so that a desirable beam diameter is achieved would require a much larger amount of correction, and besides, would result in a wider range of variation in F-number.

In the present embodiment, however, as described above, in the step of forming the incident surface forming surface M11 and the exit surface forming surface M21 of the mold, the midpoints of focal depth in the sub scanning plane is closer to the image surface 51A while the paraxial focal points are shifted from the image surface 51A (to the front in this embodiment) as described above; accordingly, modification of the mold in the subsequent correction step can be dispensed with or minimized. Moreover, in the sub scanning plane, the midpoints of focal depth of the light fluxes LB1, LB2 can be distributed closer to the image surface 51A than the paraxial focal points, so that variations in the positions of the midpoints of focal depth in the sub scanning plane can be suppressed.

It is to be understood that the number of surfaces of the polygon mirror is not limited to four; alternatively, six reflecting surfaces may be provided in a polygon mirror.

In the above-described embodiment, β1, β2, D1 and D2 are set to have values not equal to zero, but β1 and D1 may be zero. Similarly, β2 and D2 may be zero. Furthermore, the incident surface L1 and the exit surface L2 may be formed to have a shape not symmetric with respect to a plane which is orthogonal to the main scanning direction.

Moreover, the polygon mirror 5 adopted to specifically illustrate the above embodiment as one example of light deflector may be replaced by an oscillation mirror (galvanomirror), for example. The photoconductor for use in the laser printer 100 may be a photoconductor belt instead of the illustrated photoconductor drum 51.

In the above-described embodiment, the paraxial focal points are shifted to the front side of the image surface, but the paraxial focal points may be shifted to the back side of the image surface.

In the above-described embodiment, the light source are configured to comprise a single semiconductor laser 2 including two light-emitting elements emitting two laser beams, but may comprise two semiconductor lasers including a single light-emitting element emitting a single laser beam. Moreover, the number of light fluxes caused to pass through the scanning lens 6 is not limited to two, but may be one or more than two, as the case may be.

One illustrative specific example of a scanning lens included in a scanning optical apparatus will now be described below.

The incident surface and the exit surface of the scanning lens of the illustrative example are represented by the formulae (1)-(3) shown in describing the embodiment above, and parameters of the formulae (1)-(3) and the layout of the optics are shown in FIG. 6.

Figure 7:
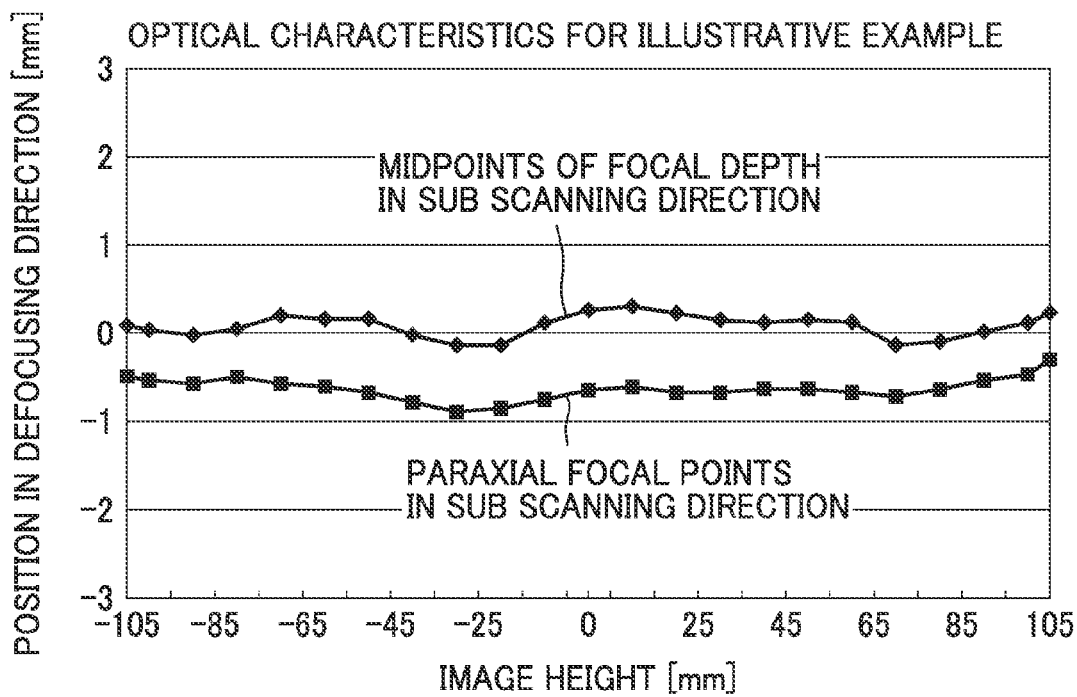
FIG. 7 is a graph showing optical characteristics, obtained from the illustrative Example.

The characteristics of an image formed using the scanning lens is shown in FIG. 7; it is shown that the paraxial focal points as a whole are shifted to the negative side (front side), and the midpoints of focal depth in the sub scanning plane are distributed in the vicinity of zero. To be more specific, as shown in FIG. 19, the maximum value Bmax of the paraxial focal points is −0.33 [mm], and the minimum value Bmin of the paraxial focal points is −0.92 [mm], all values of the paraxial focal points are negative which indicates that all the paraxial focal points are distributed on the front side. On the other hand, the maximum value Dmax of the midpoints of focal depth in the sub scanning plane is 0.26 [mm], and the minimum value Dmin of the midpoints of focal depth in the sub scanning plane is −0.18 [mm], the values are distributed on the front side and the back side of the image surface.

In this way, the scanning optical apparatus in this illustrative example is shown to satisfy: Bmax×Bmin>0, and Dmax×Dmin<0. Also, it is shown that the following condition is satisfied: |(Bmax+Bmin)/2|>|(Dmax+Dmin)/2|.

Moreover, the scanning optical apparatus in this illustrative example is shown to satisfy: Bmax<0, and Bmin<0, and Dmin>Bmax.

Figure 8:
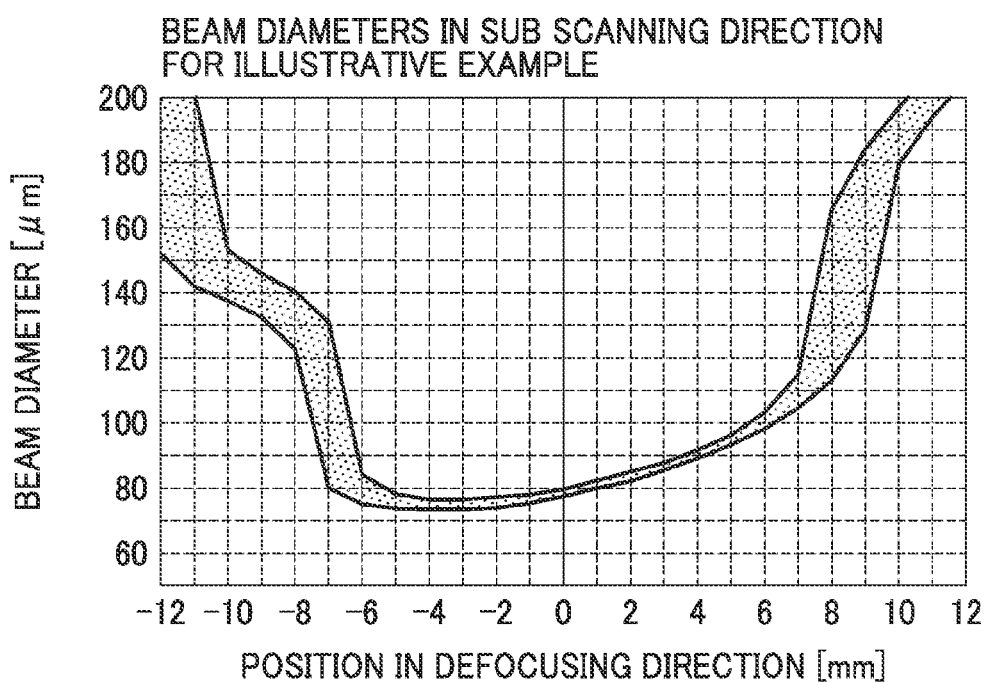
FIG. 8 is a graph showing beam diameters in the sub scanning direction as varying with positions in a defocusing direction, obtained from the illustrative Example.

Furthermore, the scanning optical apparatus in this illustrative example is shown to satisfy: |Dmax|<1 [mm], and |Dmin|<1 [mm]. Accordingly, the apparatus designed to focus a laser beam on specific range of positions on or about zero (−0.18-0.26 [mm]) along the direction of travel the laser beam according to this illustrative example can achieve stable formation of fine beam diameters as apparent from the distribution of beam diameters in the sub scanning direction shown in FIG. 8.

Figure 9:
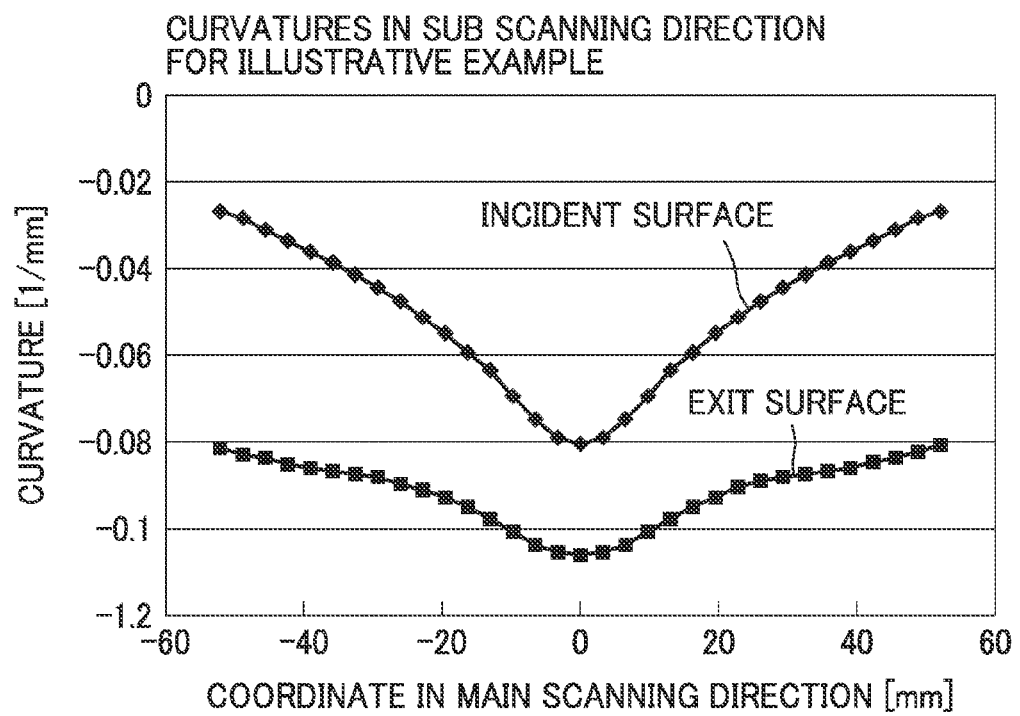
FIG. 9 is a graph showing curvatures in the sub scanning direction as determined along a coordinate in the main scanning direction, obtained from the illustrative Example.

Distribution of the curvatures in the sub scanning direction as determined along a coordinate y in the main scanning direction, obtained from the lens configured according to the illustrative Example is shown in FIG. 9. As shown in FIG. 9, each of the incident surface and the exit surface has a curvature in the sub scanning direction, of which a sign representing positiveness or negativeness thereof is retained unchanged and an absolute value decreases from the optical axis toward outside away from the optical axis, throughout the effective range of the scanning lens in the main scanning direction. In other words, the radius r'(y) of curvature along the coordinate y in the main scanning direction satisfies the condition: if |y1|<|y2|, then |r'(y1)|<|r'(y2)|.

Figure 10:
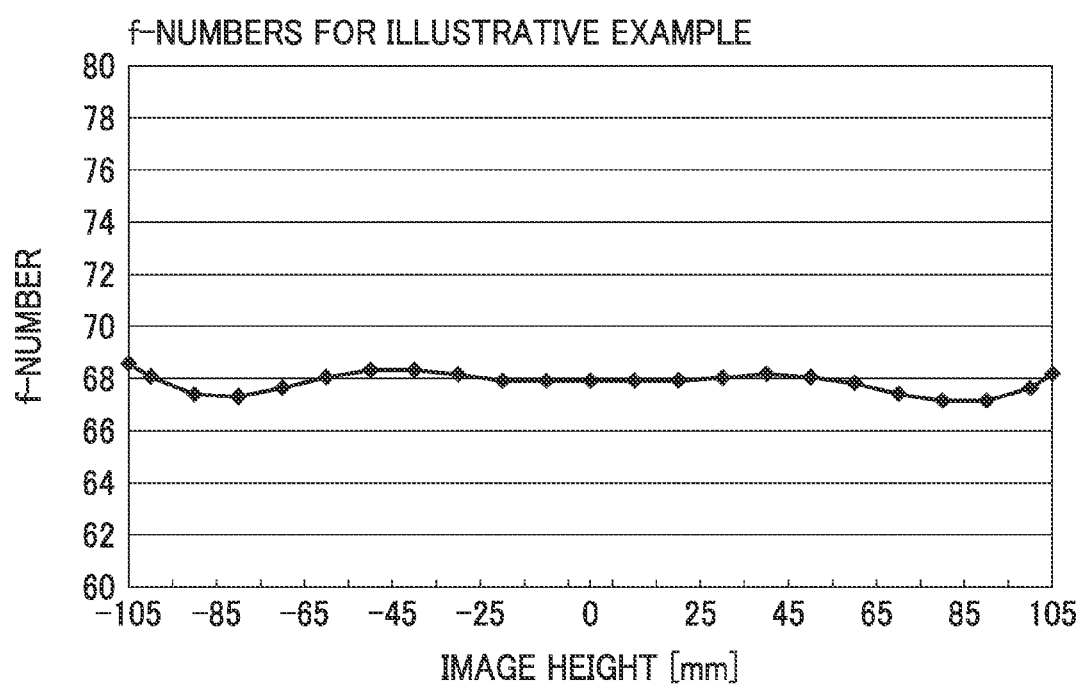
FIG. 10 is a graph showing F-numbers as varying with image heights, obtained from the illustrative Example.

In the scanning optical apparatus of the illustrative example, F-numbers are distributed as shown in FIG. 10. To pick up typical numerical values of F-number, the maximum value Fmax is 68.56, the minimum value Fmin is 67.12, and the average value is 67.85. In this way, variation of F-number (Fmax−Fmin)/Fave is 0.021 which is a preferable value that falls within a target range of values not greater than 0.05.

Next, comparative examples are shown. In each scanning optical apparatus configured for the comparative examples, a scanning lens is designed such that the paraxial focal points are not away from the image surface (such examples of scanning lens as in this stage will hereinafter be referred to as "pre-correction"), and some of parameters for this scanning lens are subjected to correction such that the midpoints of focal depth in the sub scanning plane will get closer to the image surface, which correction may assumedly be made by modifying the mold (such examples of scanning lens as in this stage will hereinafter be referred to as "post-correction").

The incident surface and the exit surface of the scanning lens of the pre-correction comparative example are represented by the same formulae (1)-(3) as shown in describing the illustrative embodiment above, and parameters of the formulae (1)-(3) and the layout of the optics are shown in FIG. 11.

Figure 12:
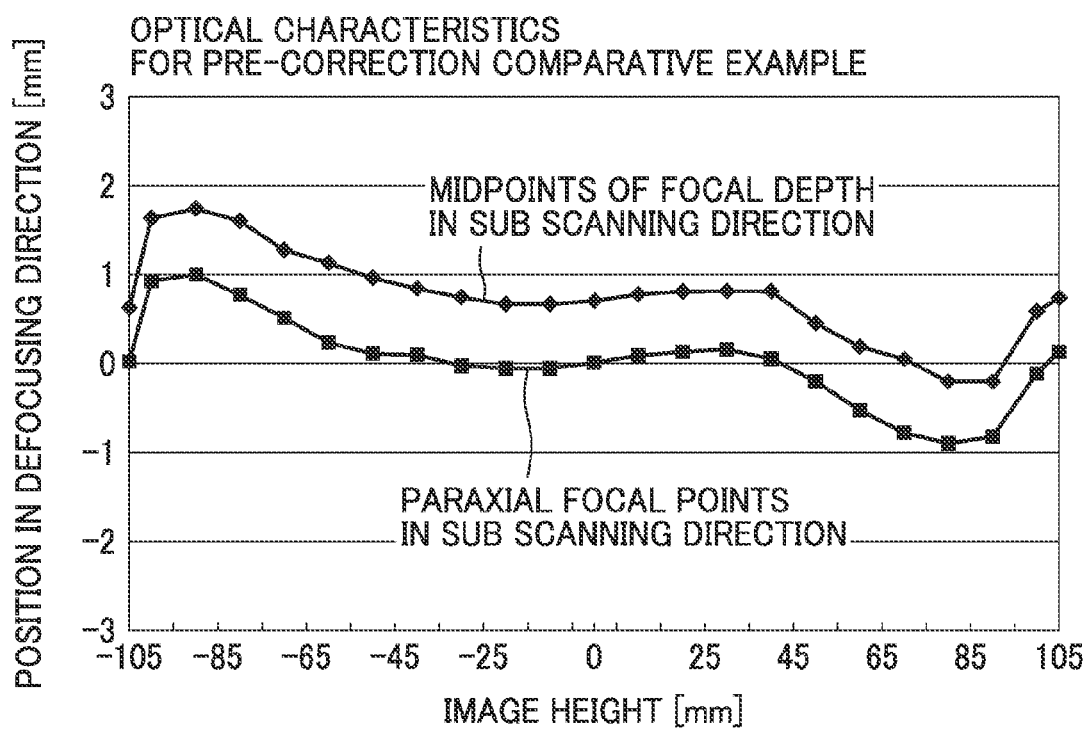
FIG. 12 is a graph showing optical characteristics, obtained from the pre-correction Comparative Example.

The characteristics of an image formed using the scanning lens is shown in FIG. 12; it is shown that the paraxial focal points are distributed in the vicinity of zero, and the midpoints of focal depth in the sub scanning plane are, substantially as a whole, shifted to the positive side (back side). To be more specific, as shown in FIG. 19, the maximum value Bmax of the paraxial focal points is 0.96 [mm], and the minimum value Bmin of the paraxial focal points is −0.94 [mm], which indicates that the paraxial focal points are distributed on the front side and on the back side of the image surface. On the other hand, the maximum value Dmax of the midpoints of focal depth in the sub scanning plane is 1.73 [mm], and the minimum value Dmin of the midpoints of focal depth in the sub scanning plane is −0.25 [mm], almost all of the values are distributed on the back side of the image surface.

Accordingly, the scanning optical apparatus in this pre-correction comparative example is shown to fail to satisfy both of the conditions: Bmax×Bmin>0, and Dmax×Dmin<0. Also, it is shown that the following condition is not satisfied: |(Bmax+Bmin)/2|>|(Dmax+Dmin)/2|.

Figure 13:
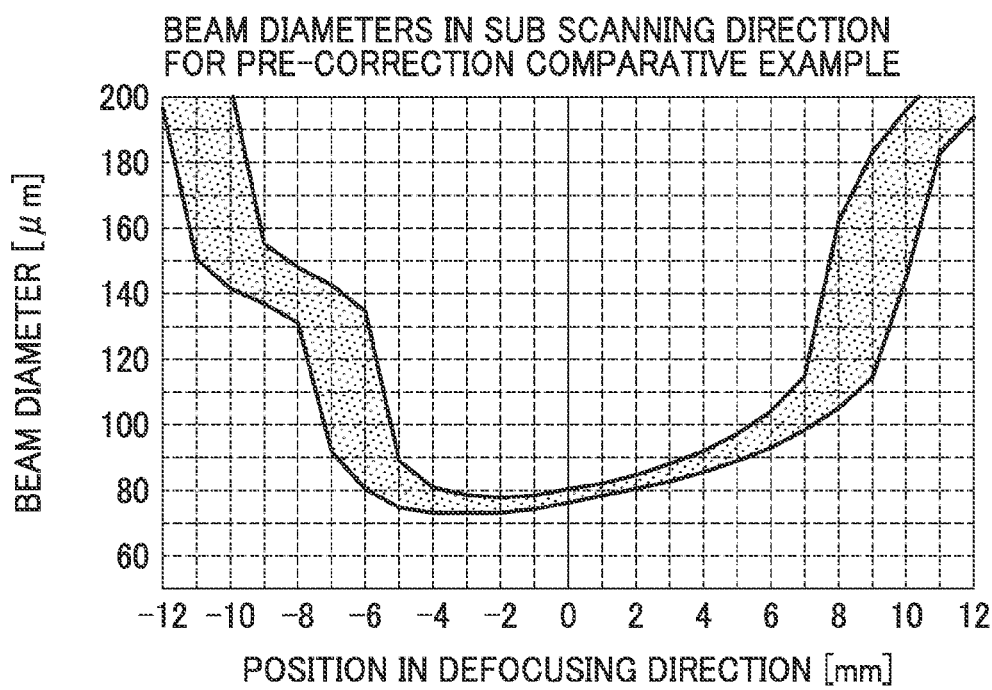
FIG. 13 is a graph showing beam diameters in the sub scanning direction as varying with positions in a defocusing direction, obtained from the pre-correction Comparative Example.

Moreover, the scanning optical apparatus in this pre-correction comparative example is shown to fail to satisfy each of the following three conditions (i)-(iii): (i) Bmax<0, and Bmin<0; (ii) Dmin>Bmax; and (iii) |Dmax|<1 [mm], and |Dmin|<1 [mm]. Consequently, the apparatus designed to focus a laser beam on a range of positions −0.94-0.96 [mm] along the direction of travel according to this pre-correction comparative example would suffer from variations in beam diameters, greater than those of the apparatus configured according to the illustrative example, as apparent from the distribution of beam diameters in the sub scanning direction shown in FIG. 13.

Figure 14:
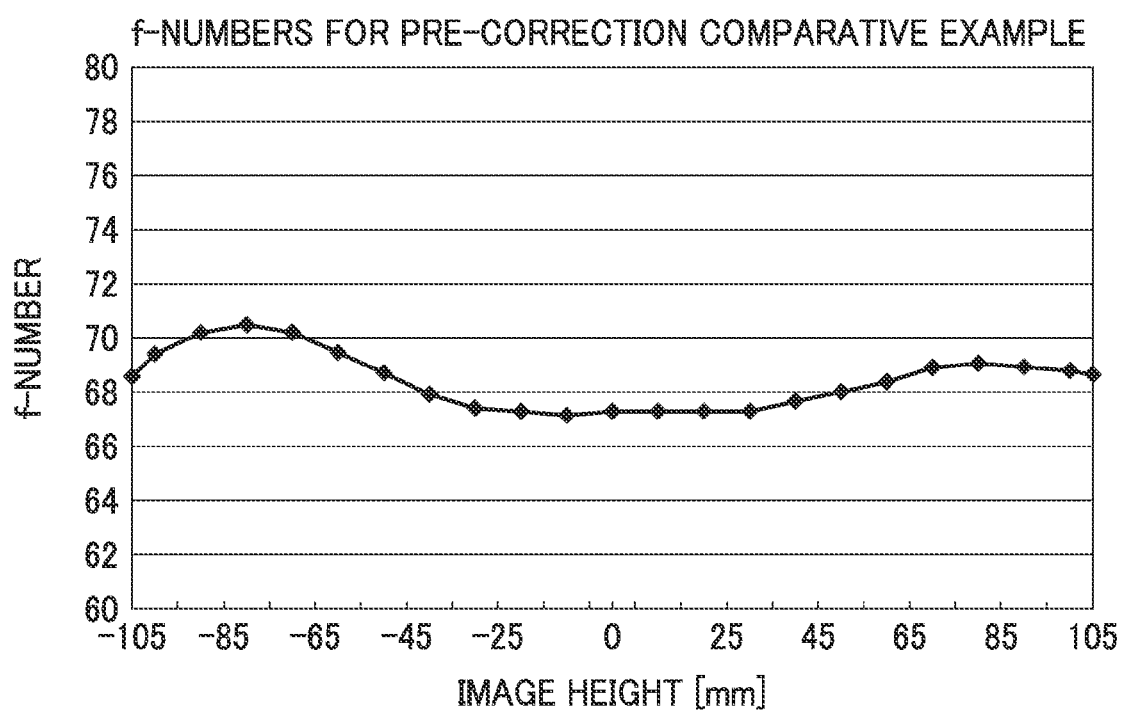
FIG. 14 is a graph showing F-numbers as varying with image heights, obtained from the pre-correction Comparative Example.

In the scanning optical apparatus of the pre-correction comparative example, F-numbers are distributed as shown in FIG. 14. To pick up typical numerical values of F-number, the maximum value Fmax is 70.51, the minimum value Fmin is 67.19, and the average value is 68.43. In this way, variation of F-number (Fmax−Fmin)/Fave is 0.048 which narrowly falls within a target range of values not greater than 0.05, but worse than that of the illustrative example.

The scanning lens of the post-correction comparative example is a lens of which optical characteristics are corrected by modifying $C_x$ and B2-B12 of the incident surface. The incident surface and the exit surface of the scanning lens of the post-correction comparative example are represented by the same formulae (1)-(3) as shown in describing the illustrative embodiment above, and parameters of the formulae (1)-(3) and the layout of the optics are shown in FIG. 15.

Figure 16:
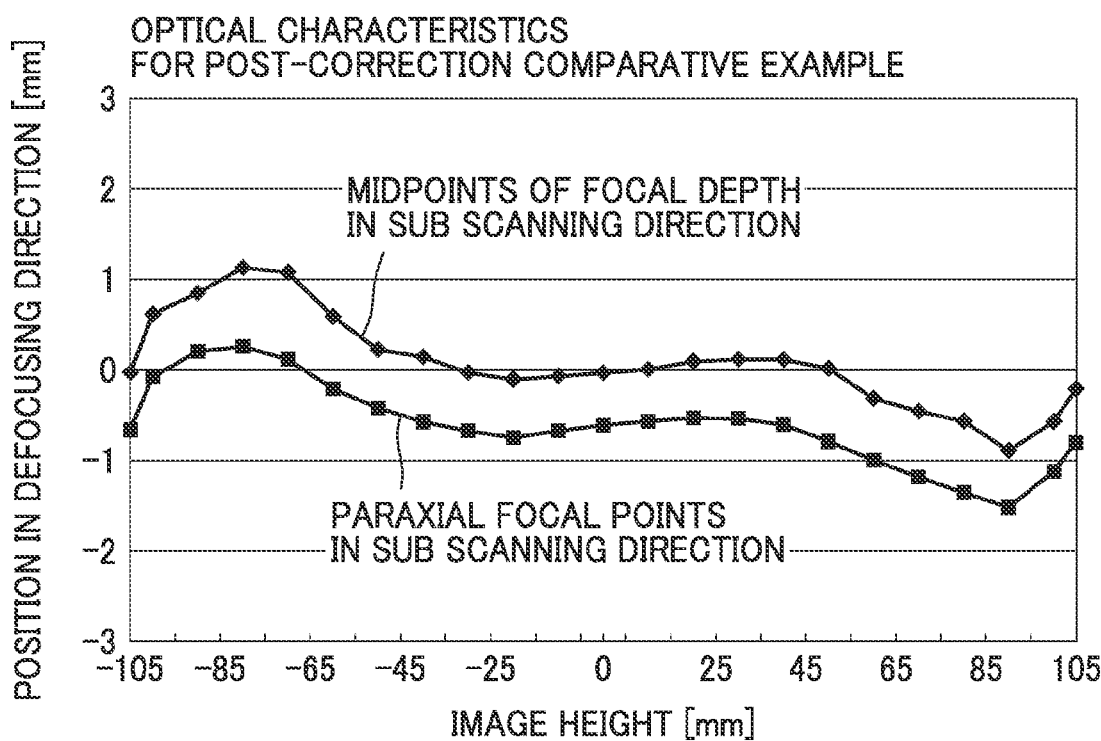
FIG. 16 is a graph showing optical characteristics, obtained from the post-correction Comparative Example.

The characteristics of an image formed using the scanning lens is shown in FIG. 16; it is shown that the paraxial focal points are, substantially as a whole, distributed in the range covering positions in the vicinity of zero and positions shifted therefrom to the negative side (front side), and the midpoints of focal depth in the sub scanning plane are distributed in the vicinity of zero. To be more specific, as shown in FIG. 19, the maximum value Bmax of the paraxial focal points is 0.22 [mm], and the minimum value Bmin of the paraxial focal points is −1.55 [mm], which indicates that the paraxial focal points are distributed, substantially as a whole, in positions shifted to the front side of the image surface. On the other hand, the maximum value Dmax of the midpoints of focal depth in the sub scanning plane is 1.10 [mm], and the minimum value Dmin of the midpoints of focal depth in the sub scanning plane is −0.91 [mm], the values are distributed on the front side and on the back side of the image surface.

Accordingly, the scanning optical apparatus in this post-correction comparative example is shown to fail to satisfy: Bmax×Bmin>0, and Dmax×Dmin<0. On the other hand, it is shown that, as a result of correction, the following condition is satisfied: |(Bmax+Bmin)/2|>|(Dmax+Dmin)/2|.

Figure 17:
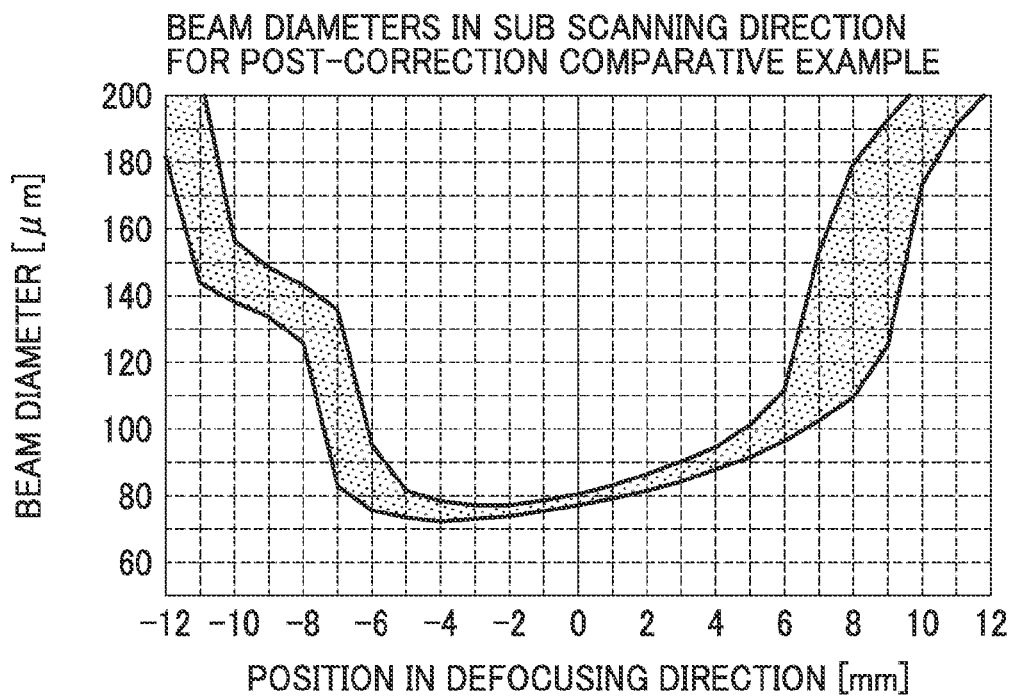
FIG. 17 is a graph showing beam diameters in the sub scanning direction as varying with positions in a defocusing direction, obtained from the post-correction Comparative Example.

Moreover, the scanning optical apparatus in this post-correction comparative example is shown to fail to satisfy each of the following three conditions (i)-(iii): (i) Bmax<0, and Bmin<0; (ii) Dmin>Bmax; and (iii) |Dmax|<1 [mm], and |Dmin|<1 [mm]. Consequently, the apparatus designed to focus a laser beam on a range of positions −0.91-1.10 [mm] along the direction of travel according to this post-correction comparative example would suffer from variations in beam diameters, greater than those of the apparatus configured according to the illustrative example, as apparent from the distribution of beam diameters in the sub scanning direction shown in FIG. 17.

Figure 18:
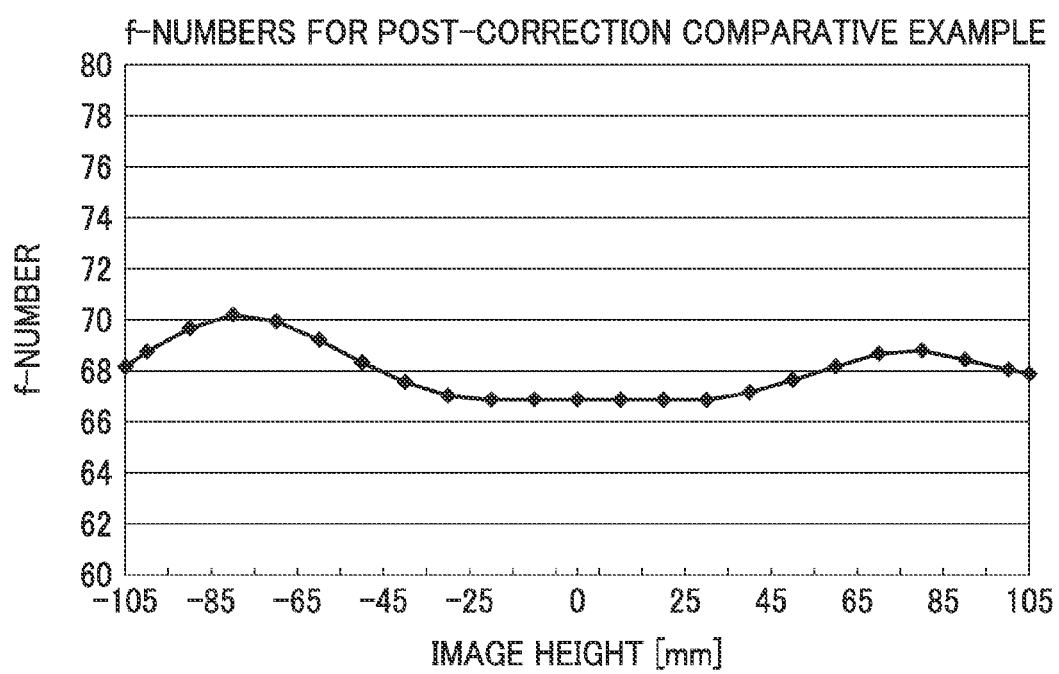
FIG. 18 is a graph showing F-numbers as varying with image heights, obtained from the post-correction Comparative Example.

In the scanning optical apparatus of the post-correction comparative example, F-numbers are distributed as shown in FIG. 18. To pick up typical numerical values of F-number, the maximum value Fmax is 70.18, the minimum value Fmin is 66.83, and the average value Fave is 68.03. In this way, variation of F-number (Fmax−Fmin)/Fave is 0.049 which narrowly falls within a target range of values not greater than 0.05, but worse than that of the illustrative example.

Accordingly, it has been shown that the illustrative example of configurations in which the midpoints of focal depth in the sub scanning plane are adjusted so as to be distributed in the vicinity of zero in the initial mold preparation stage ("preparation step" mentioned above) of manufacture is advantageous in that variation in F-number of the final product is smaller. It has thus been shown that in a multi-beam scanning optical apparatus comprising a plurality of light sources arranged in the sub scanning direction, variations of the pitches in the sub scanning direction of the beam spots on the image surface 51A to be scanned is reduced to advantage.

What is claimed is:

1. A scanning optical apparatus comprising:
a light source configured to emit a light flux;
a light deflector having a reflecting surface and configured to deflect the light flux emitted from the light source in a main scanning direction; and
a single scanning lens configured to focus the light flux deflected by the light deflector on an image surface to be scanned, the scanning lens being configured such that:
the reflecting surface and the image surface are conjugate to each other with respect to a sub scanning direction orthogonal to the main scanning direction, $B\text{max} \times B\text{min} > 0$, and $D\text{max} \times D\text{min} < 0$ where Bmax is a maximum value of paraxial focal points in the sub scanning plane, Bmin is a minimum value of the paraxial focal points in the sub scanning plane, Dmax is a maximum value of midpoints of focal depth in the sub scanning plane, and Dmin is a minimum value of the midpoints of focal depth in the sub scanning plane, the values being determined with reference to the image surface, wherein the value of the image surface is 0 and the values of points on a farther-from-the-scanning-lens side behind the image surface have positive values,
wherein the following condition is satisfied:

$|(B\text{max}+B\text{min})/2| > |(D\text{max}+D\text{min})/2|$.

2. The scanning optical apparatus according to claim 1, wherein the following conditions are satisfied:

$B\text{max} < 0$, and $B\text{min} < 0$.

3. The scanning optical apparatus according to claim 2, wherein the following condition is satisfied:

$D\text{min} > B\text{max}$.

4. The scanning optical apparatus according to claim 1, wherein the following conditions are satisfied:

$|D\text{max}| < 1$ [mm], and $|D\text{min}| < 1$ [mm].

5. The scanning optical apparatus according to claim 1, wherein the following condition is satisfied:

$(F\text{max}-F\text{min})/F\text{ave} < 0.05$ where Fmax is a maximum F-number in the sub scanning direction, Fmin is a minimum F-number in the sub scanning direction, and Fave is an average F-number in the sub scanning direction.

6. The scanning optical apparatus according to claim 1, wherein the scanning lens has an incident surface and an exit surface, at least one of the incident and exit surfaces is a toric surface, and a generatrix of the toric surface is represented by the formula (1):

$$z = \frac{C_y y^2}{1+\sqrt{1-(1+cc)c_y^2 y^2}} + A_4 y^4 + A_6 y^6 + A_8 y^8 + A_{10} y^{10} + A_{12} y^{12} \quad (1)$$

where y is a coordinate of y-axis that is contained in a main scanning plane, z is a coordinate of z-axis parallel to an optical axis, $C_y$ is the reciprocal of the radius of curvature in the main scanning direction on the optical axis, and cc, $A_4, \ldots, A_{12}$ are constants, and
wherein a radius r'(y) of curvature in the sub scanning direction on a coordinate y satisfies the formula (2):

$r'(y)=1/C_x(1+B_2 y^2+B_4 y^4+B_6 y^6+B_8 y^8+B_{10} y^{10}+B_{12} y^{12})$ (2)

where $C_x$ is the reciprocal of the radius of curvature in the sub scanning direction on the optical axis, and $B_2, \ldots, B_{12}$ are constants.

7. The scanning optical apparatus according to claim 1, wherein the scanning lens has an incident surface and an exit surface, each of the incident and exit surfaces is a toric surface, and a generatrix of the toric surface is represented by the formula (1):

$$z = \frac{C_y y^2}{1+\sqrt{1-(1+cc)c_y^2 y^2}} + A_4 y^4 + A_6 y^6 + A_8 y^8 + A_{10} y^{10} + A_{12} y^{12} \quad (1)$$

where y is a coordinate of y-axis that is contained in a main scanning plane, z is a coordinate of z-axis parallel to an optical axis, $C_y$ is the reciprocal of the radius of curvature in the main scanning direction on the optical axis, and cc, $A_4, \ldots, A_{12}$ are constants, and
wherein a radius r'(y) of curvature in the sub scanning direction on a coordinate y satisfies the formula (2):

$r'(y)=1/C_x(1+B_2 y^2+B_4 y^4+B_6 y^6+B_8 y^8+B_{10} y^{10}+B_{12} y^{12})$ (2)

where $C_x$ is the reciprocal of the radius of curvature in the sub scanning direction on the optical axis, and $B_2, \ldots, B_{12}$ are constants.

8. The scanning optical apparatus according to claim 7, wherein each of the incident and exit surfaces of the scanning lens has a curvature in the sub scanning direction, of which a sign representing positiveness or negativeness thereof is retained unchanged and an absolute value decreases from the optical axis toward outside away from the optical axis, throughout an effective range of the scanning lens in the main scanning direction.

9. The scanning optical apparatus according claim 7, wherein if |y1|<|y2|, then the following condition is satisfied:

$|r'(y1)|<|r'(y2)|$.

10. The scanning optical apparatus according to claim 7, wherein the scanning lens has a shape in a sub scanning plane such that the incident surface is concaved toward the image surface and the exit surface is convexed toward the image surface.

11. The scanning optical apparatus according to claim 7, wherein the light deflector comprises a polygon mirror having a plurality of reflecting surfaces;

wherein each of the incident and exit surfaces has a shape symmetric with respect to a plane which is orthogonal to the main scanning direction and in which a corresponding optical axis thereof is contained; and wherein the optical axis of the exit surface inclines in a plane parallel to the main scanning plane with respect to the optical axis of the incident surface, and a point of intersection of the optical axis of the exit surface with the exit surface is shifted from the optical axis of the incident surface in the main scanning direction.

12. The scanning optical apparatus according to claim 1, wherein a center of the light flux deflected by the light deflector is directed to pass through the scanning lens at a position shifted in the sub scanning direction from a plane in which the optical axes of the incident and exit surfaces are contained and which is parallel to a main scanning plane.

13. The scanning optical apparatus according to claim 1, wherein the light source is configured to emit a plurality of light fluxes at positions shifted from each other in the sub scanning direction.

14. An image forming apparatus comprising:
a photoconductor having an image surface to be exposed to light;
a light source configured to emit a light flux;
a light deflector having a reflecting surface and configured to deflect the light flux emitted from the light source in a main scanning direction;
a single scanning lens configured to focus the light flux deflected by the light deflector on the image surface; and
a development unit configured to supply developer onto the image surface of the photoconductor,
wherein the scanning lens is configured such that:
the reflecting surface and the image surface are conjugate to each other with respect to a sub scanning direction orthogonal to the main scanning direction, $B\text{max} \times B\text{min} > 0$, and $D\text{max} \times D\text{min} < 0$ where Bmax is a maximum value of paraxial focal points in the sub scanning plane, Bmin is a minimum value of the paraxial focal points in the sub scanning plane, Dmax is a maximum value of midpoints of focal depth in the sub scanning plane, and Dmin is a minimum value of the midpoints of focal depth in the sub scanning plane, the values being determined with reference to the image surface, wherein the value of the image surface is 0 and the values of points on a farther-from-the-scanning-lens side behind the image surface have positive values, and
wherein the following condition is satisfied:

$|(B\text{max}+B\text{min})/2| > |(D\text{max}+D\text{min})/2|$.

15. The scanning optical apparatus according to claim 14, wherein the following condition is satisfied:

$(F\text{max}-F\text{min})/F\text{ave} < 0.05$ where Fmax is a maximum F-number in the sub scanning direction, Fmin is a minimum F-number in the sub scanning direction, and Fave is an average F-number in the sub scanning direction.

16. A method for manufacturing a scanning lens for use in a scanning optical apparatus which includes a light source configured to emit a light flux, a light deflector having a reflecting surface and configured to deflect the light flux emitted from the light source in a main scanning direction and a single scanning lens configured to focus the light flux deflected by the light deflector on an image surface to be scanned, the scanning lens being configured such that the reflecting surface and the image surface are conjugate to each other with respect to a sub scanning direction orthogonal to the main scanning direction, the method comprising:
providing a first mold having an incident surface forming surface corresponding to an incident surface and a second mold having an exit surface forming surface corresponding to an exit surface; and
forming a scanning lens using the first mold and the second mold,
wherein the providing the first mold and the second mold comprises forming the incident surface forming surface of the first mold and the exit surface forming surface of the second mold in such a manner that:

$B\text{max} \times B\text{min} > 0$, and $D\text{max} \times D\text{min} < 0$ where Bmax is a maximum value of paraxial focal points in the sub scanning plane, Bmin is a minimum value of the paraxial focal points in the sub scanning plane, Dmax is a maximum value of midpoints of focal depth in the sub scanning plane, and Dmin is a minimum value of the midpoints of focal depth in the sub scanning plane, the values being determined with reference to the image surface, wherein the value of the image surface is 0 and the values of points on a farther-from-the-scanning-lens side behind the image surface have positive values, and
wherein the following condition is satisfied:

$|(B\text{max}+B\text{min})/2| > |(D\text{max}+D\text{min})/2|$.

17. A scanning optical apparatus comprising:
a light source configured to emit a light flux;
a light deflector having a reflecting surface and configured to deflect the light flux emitted from the light source in a main scanning direction; and
a single scanning lens configured to focus the light flux deflected by the light deflector on an image surface to be scanned, the scanning lens being configured such that:
the reflecting surface and the image surface are conjugate to each other with respect to a sub scanning direction orthogonal to the main scanning direction, $B\text{max} \times B\text{min} > 0$, and $D\text{max} \times D\text{min} < 0$ where Bmax is a maximum value of paraxial focal points in the sub scanning plane, Bmin is a minimum value of the paraxial focal points in the sub scanning plane, Dmax is a maximum value of midpoints of focal depth in the sub scanning plane, and Dmin is a minimum value of the midpoints of focal depth in the sub scanning plane, the values being determined with reference to the image surface, wherein the value of the image surface is 0 and the values of points on a farther-from-the-scanning-lens side behind the image surface have positive values,
wherein the following conditions are satisfied:

$B\text{max} < 0$, $B\text{min} < 0$, and $D\text{min} > B\text{max}$.

18. The scanning optical apparatus according to claim 17, wherein the following condition is satisfied:

$(F\text{max}-F\text{min})/F\text{ave} < 0.05$ where Fmax is a maximum F-number in the sub scanning direction, Fmin is a minimum F-number in the sub scanning direction, and Fave is an average F-number in the sub scanning direction.

19. A scanning optical apparatus comprising:
- a light source configured to emit a light flux;
- a light deflector having a reflecting surface and configured to deflect the light flux emitted from the light source in a main scanning direction; and
- a single scanning lens configured to focus the light flux deflected by the light deflector on an image surface to be scanned, the scanning lens being configured such that:
- the reflecting surface and the image surface are conjugate to each other with respect to a sub scanning direction orthogonal to the main scanning direction, $$B\text{max} \times B\text{min} > 0, \text{ and}$$

$$D\text{max} \times D\text{min} < 0$$

where Bmax is a maximum value of paraxial focal points in the sub scanning plane, Bmin is a minimum value of the paraxial focal points in the sub scanning plane, Dmax is a maximum value of midpoints of focal depth in the sub scanning plane, and Dmin is a minimum value of the midpoints of focal depth in the sub scanning plane, the values being determined with reference to the image surface, wherein the value of the image surface is 0 and the values of points on a farther-from-the-scanning-lens side behind the image surface have positive values, wherein the following conditions are satisfied:

$$|D\text{max}| < 1 \text{ [mm], and}$$

$$|D\text{min}| < 1 \text{ [mm]}.$$

20. The scanning optical apparatus according to claim 19, wherein the following condition is satisfied:

$$(F\text{max} - F\text{min})/F\text{ave} < 0.05$$

where Fmax is a maximum F-number in the sub scanning direction, Fmin is a minimum F-number in the sub scanning direction, and Fave is an average F-number in the sub scanning direction.

* * * * *